United States Patent
Schmid

(10) Patent No.: US 11,975,676 B2
(45) Date of Patent: May 7, 2024

(54) AIRBAG AND AIRBAG MODULE, METHOD FOR PRODUCING AN AIRBAG WOVEN AS A SINGLE PIECE, AND METHOD FOR PRODUCING AN AIRBAG MODULE

(71) Applicant: ZF AUTOMOTIVE GERMANY GMBH, Alfdorf (DE)

(72) Inventor: Tatjana Schmid, Böbingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/763,238

(22) PCT Filed: Sep. 23, 2020

(86) PCT No.: PCT/EP2020/076531
§ 371 (c)(1),
(2) Date: Mar. 24, 2022

(87) PCT Pub. No.: WO2021/058542
PCT Pub. Date: Apr. 1, 2021

(65) Prior Publication Data
US 2022/0388473 A1 Dec. 8, 2022

(30) Foreign Application Priority Data

Sep. 25, 2019 (DE) ...................... 10 2019 125 794.8

(51) Int. Cl.
*B60R 21/235* (2006.01)
*B32B 3/08* (2006.01)
(Continued)

(52) U.S. Cl.
CPC ............. *B60R 21/235* (2013.01); *B32B 3/08* (2013.01); *B32B 5/024* (2013.01); *B32B 5/263* (2021.05);
(Continued)

(58) Field of Classification Search
CPC ........... B60R 2021/23547; B60R 2021/23509; B60R 2021/23514; B60R 2021/2612;
(Continued)

(56) References Cited

U.S. PATENT DOCUMENTS 5,011,183 A * 4/1991 Thornton ................. D03D 1/02
139/389
5,259,645 A 11/1993 Hirabayashi et al.
(Continued)

FOREIGN PATENT DOCUMENTS

EP 2156994 A1 2/2010
EP 2156996 B1 10/2011
(Continued)

OTHER PUBLICATIONS

PCT International Search Report for corresponding International Application Serial No. PCT/EP2020/076531, dated Nov. 2, 2020, pp. 1-4.

*Primary Examiner* — Keith J Frisby
(74) *Attorney, Agent, or Firm* — TAROLLI, SUNDHEIM, COVELL & TUMMINO L.L.P.

(57) ABSTRACT

The invention describes an airbag (10), in particular a head side airbag (10) or a head-thorax side airbag, including at least two opposite fabric layers (12, 14) which form at least one inner wall (13) and one outer wall (15) of the airbag (10), wherein the airbag (10) is manufactured in one piece by a multi-layer weaving process in which the fabric layers (12, 14) are interwoven at least in a peripheral region (16), with a gas generator mount (18) for an external gas generator (20) being disposed in either of the two fabric layers (12, 14). The invention further describes an airbag module (8) comprising an airbag (10) according to the invention as well as a method for manufacturing a one-piece-woven airbag (10) and a method for manufacturing an airbag module (8).

17 Claims, 7 Drawing Sheets

(51) Int. Cl.
  *B32B 5/02* (2006.01)
  *B32B 5/26* (2006.01)
  *B32B 7/09* (2019.01)
  *B60R 21/217* (2011.01)
  *B60R 21/232* (2011.01)
  *B60R 21/261* (2011.01)

(52) U.S. Cl.
  CPC .............. *B32B 7/09* (2019.01); *B60R 21/217* (2013.01); *B60R 21/232* (2013.01); *B60R 21/261* (2013.01); *B32B 2250/20* (2013.01); *B32B 2255/02* (2013.01); *B32B 2262/0261* (2013.01); *B32B 2262/0284* (2013.01); *B32B 2605/00* (2013.01); *B60R 2021/23509* (2013.01); *B60R 2021/23514* (2013.01); *B60R 2021/23547* (2013.01); *B60R 2021/23561* (2013.01); *B60R 2021/2617* (2013.01)

(58) Field of Classification Search
  CPC .. B60R 2021/2617; B60R 2021/23561; B60R 2021/23542; B60R 21/232; B60R 21/235; B60R 21/261; B60R 21/231; B60R 21/213; B60R 21/214; B60R 21/23138; B60R 21/217; B32B 3/08; D03D 1/02; D03D 11/02; D10B 2505/124
  USPC .................. 280/728.1, 728.2, 730.1, 730.2
  See application file for complete search history.

(56) References Cited

U.S. PATENT DOCUMENTS

| | | |
|---|---|---|
| 2004/0245749 A1 | 12/2004 | Goujon |
| 2010/0225098 A1* | 9/2010 | Baumgartner ...... B60R 21/2346 |
| | | 280/736 |
| 2017/0247012 A1* | 8/2017 | Low .................. D03D 1/02 |
| 2022/0274557 A1* | 9/2022 | Disam .................. B60R 21/261 |

FOREIGN PATENT DOCUMENTS

| | | | |
|---|---|---|---|
| FR | 2855125 A1 | 11/2004 | |
| KR | 20170077642 A * | 7/2017 | |
| WO | WO-0001559 A1 * | 1/2000 | ....... B60R 21/23138 |
| WO | 2005/076687 A2 | 8/2005 | |
| WO | 2010/020302 A1 | 2/2010 | |

* cited by examiner

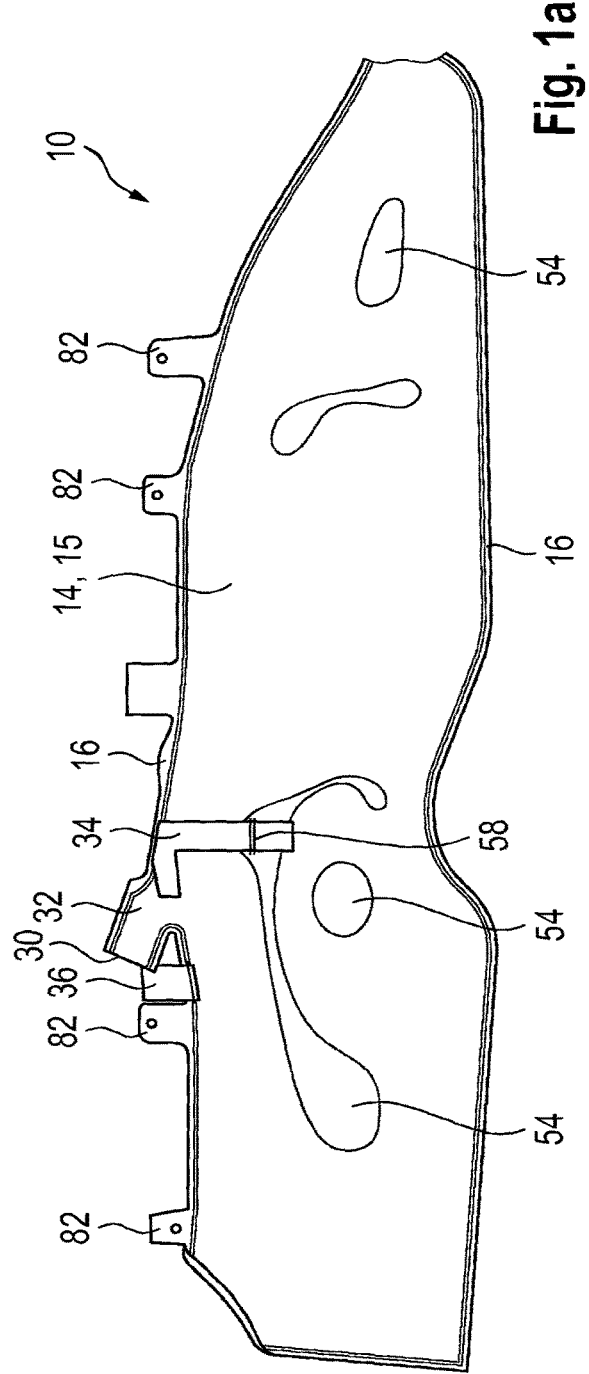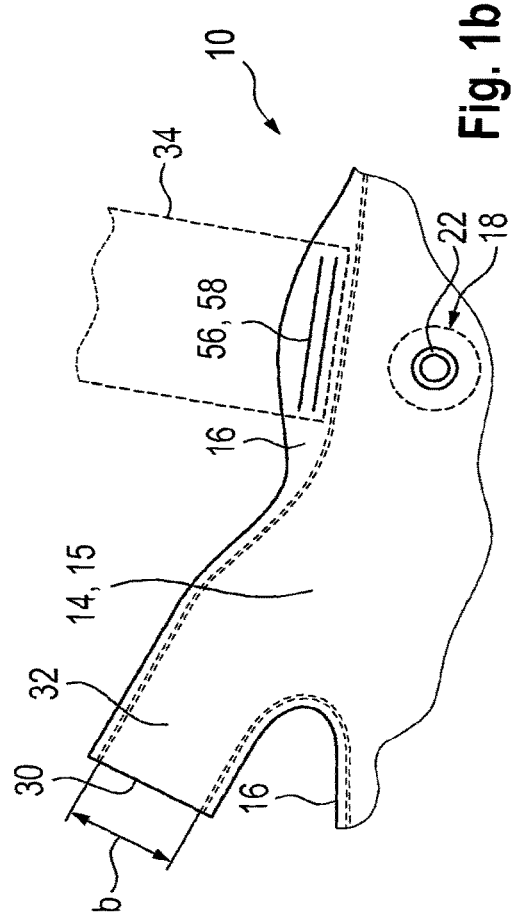

AIRBAG AND AIRBAG MODULE, METHOD FOR PRODUCING AN AIRBAG WOVEN AS A SINGLE PIECE, AND METHOD FOR PRODUCING AN AIRBAG MODULE

RELATED APPLICATIONS

This application is a U.S. National Stage Application filed under 35 USC 371, claiming priority to Serial No. PCT/EP2020/076531, filed on 23 Sep. 2020; which claims priority from German Patent Application DE 10 2019 125 794.8, filed 25 Sep. 2019, the entireties of which are hereby incorporated herein by reference.

TECHNICAL FIELD

The invention relates to an airbag, an airbag module according, a method for manufacturing a one-piece-woven airbag and a method for manufacturing an airbag module.

BACKGROUND

From the state of the art, airbag modules including airbags one-piece-woven in a multi-layer weaving process (so-called OPW airbags) are known which are used, for example, in head side airbags or head-thorax side airbags arranged in the area of the roof edge (so-called curtain airbags).

In airbag modules of this type, a tubular gas generator is inserted at least partially into an inflation mouth of the airbag, and the airbag is secured around the outer housing of the gas generator. Safe connection between the gas generator and the airbag can be ensured by one or more fixing bolts projecting laterally from the gas generator and protruding through holes in the airbag and/or in a module holder and/or by one or more clips and/or by a fixing strap/fabric. In particular the clip(s) and/or the fixing strap moreover ensure sufficient sealing of the opening in the area of the inflation mouth into which the gas generator is inserted. The tubular gas generator is thus arranged to be located substantially inside the airbag in the completely assembled airbag module.

For deflecting the gas radially flowing out of the gas generator when the gas generator is activated and for preventing the hot gas flowing out of the outflow area of the gas generator from being directly applied to the airbag in the area of the inflation mouth, a specific fabric layer and/or a reinforcing layer is/are introduced to the airbag in the area of the inflation mouth. As a rule, it is very complicated, however, to introduce said fabric layer and, thus, to assemble the entire airbag module.

SUMMARY

It is the object of the invention to provide a one-piece-woven airbag and a method for manufacturing a one-piece-woven airbag with an alternative connection that can be manufactured more easily for a gas generator. It is another object of the invention to provide an airbag module as well as a method for manufacturing an airbag module including a one-piece-woven airbag with an alternative connection that can be manufactured more easily for a gas generator.

The features according to the claims result in achieving the object. Advantageous configurations are described in the subclaims.

An airbag according to the invention is in the form of an airbag manufactured in one piece in a multi-layer weaving process (OPW airbag) comprising at least two opposite fabric layers which form at least one outer wall and one inner wall of the airbag and are interwoven at least in a peripheral region, and, in one of the two fabric layers, includes a gas generator mount for an external gas generator. An airbag according to the invention is preferably in the form of a head side airbag or a head-thorax side airbag which in a vehicle-mounted state is preferably mounted in the area of the roof edge. A head side airbag or head-thorax side airbag of this type in the deployed and filled state covers substantially an area of the side windows of the vehicle to protect vehicle occupants seated in the adjacent vehicle seats in an event of damage. The inner wall of the airbag constitutes the side of the airbag facing the vehicle occupant, and the outer wall constitutes the side of the airbag facing the lateral body and the side windows.

In a preferred embodiment, the gas generator mount of the one-piece-woven airbag having a particularly circular opening comprises a sealing element. The sealing element is preferably adhesively connected to the fabric layer. In a preferred embodiment, the sealing element is connected to the fabric layer by ultrasonic welding. As an alternative to ultrasonic welding, it is also possible to make the adhesive connection by adhesively bonding the sealing element to the fabric layer. The sealing element helps ensure that, when the airbag is filled by the gas generator inserted in the gas generator mount and when the filling operation is completed, no or only minor amounts of gas can escape from the airbag interior in the area of the gas generator mount. In this way, particularly by the sealing element the sealing of the airbag against escape of gas in the area of the gas generator mount is facilitated and improved as compared to known OPW airbags.

In a first embodiment, the sealing element is in the form of a single-component part. In such embodiment, the sealing element is preferably made of the same material as the airbag. Preferably, the sealing element is therefore made of a thermoplastic resin, such as a polyamide (PA) or a polyethylene terephthalate (PET).

In further embodiments, the sealing element is in the form of a two-component part and comprises a seal membrane and a weld element or a seal membrane and an adhesive element. The seal membrane and the weld element or the seal membrane and the adhesive element preferably consist of different materials.

The seal membrane of the sealing element is preferably made of a silicone. It has turned out that such a seal membrane of silicone allows to obtain excellent sealing between the gas generator and the fabric layer in the area of the gas generator mount which permits no or only minor escape of gas from the airbag interior in the area of the gas generator mount.

The weld element of the sealing element may be manufactured of an airbag fabric, for example. Preferably, the weld element is made of the same material, in particular of the same fabric, as the fabric layers of the airbag. As the weld element of the sealing element is made of the same material and/or fabric as the fabric layers of the airbag, a very stable weld joint can be produced during ultrasonic welding between the sealing element and the fabric layer. Therefore, thermoplastic resins such as polyamides (PA) or polyethylene terephthalates (PET) are preferably used for manufacturing the weld element of the sealing element.

In one embodiment, the airbag comprises a mounting hole arranged in the peripheral region of the airbag adjacent to the gas generator mount for securing the sealing element to the gas generator mount. The mounting hole can be formed, for example, by the fact that the two fabric layers of the airbag are not interwoven in the portion of the peripheral region where the mounting hole is to be arranged. Alternatively, the hole can also be formed by separating a portion of the airbag in the peripheral region where the mounting hole is to be arranged. The fabric layers are connected to each other in the area of the mounting hole particularly by ultrasonic welding or by sewing. To minimize the loads acting on the connection of the fabric layers of the airbag in the area of the mounting hole, the mounting hole is disposed in the airbag preferably in a tubular extension. In this way, for example the pressure prevailing inside the airbag during filling the airbag can be minimized in this area and, thus, closing of the mounting hole can be enabled by ultrasonic welding.

The mounting hole may have a width of 40 mm to 100 mm. In preferred embodiments, the mounting hole has a width preferably ranging from 60 mm to 80 mm. The width of the mounting hole is preferably designed such that, in the open state in which the two fabric layers are not yet connected to each other, it can receive a mounting aid for attaching the sealing element to the gas generator mount. The mounting aid may be, for example, a converter of an ultrasonic welding device including a holding fixture for the sealing element or a positioning tool, in particular a positioning tool of a heat-sealing device, including a holding fixture for the sealing element.

Moreover, the airbag may comprise at least one gas generator securing element.

The gas generator securing element can be formed integrally with the airbag and can particularly be manufactured together with the at least two fabric layers already when it is manufactured in the multi-layer weaving process. In such embodiment, the at least one gas generator securing element is interwoven with at least one of the fabric layers.

Alternatively, the gas generator securing element is a separate component which is secured to at least one of the fabric layers of the airbag by a suitable connection, in particular by ultrasonic welding, welding, sewing and/or adhesive bonding.

In a preferred embodiment, the fabric layer forming the inner wall and/or the outer wall of the airbag is coated at least in portions, preferably by an externally applied film. The coating is preferably applied to an outer face of the airbag. In a preferred embodiment, the fabric layers forming the inner wall and the outer wall are completely coated on the outer face of the airbag.

The object of the invention is further achieved by an airbag module comprising an afore-described airbag according to the invention and a gas generator with a diffusor. The diffusor of the gas generator is in the form of a T diffusor having a collecting portion and a discharge portion, the discharge portion projecting from the collecting portion preferably in a radial direction and the collecting portion preferably enclosing a discharge zone of the gas generator disposed in the area of the axial end. The gas generator is arranged, in the airbag module according to the invention, outboards on the one-piece-woven airbag such that the discharge portion of the diffusor is accommodated in the gas generator mount so that discharge holes of the diffusor disposed in the discharge portion are disposed in the interior of the airbag. In the airbag module according to the invention, the gas generator is secured to the airbag and/or a module holder via gas generator securing elements.

The diffusor of the gas generator is preferably configured as a separate component, but it may also be formed integrally and/or in one piece with the gas generator housing of the gas generator.

Preferably, the gas generator securing elements are formed in one piece with at least one of the fabric layers or as a separate component that is secured to at least one of the fabric layers of the airbag by a suitable connection, in particular by ultrasonic welding, welding, sewing and/or adhesive bonding. In addition, the gas generator securing elements for securing the gas generator to the airbag and/or to the module holder can be configured as clamping elements, e.g., in the form of clips, and/or as securing elements comprising a bolt-and-nut connection, for example.

The object of the invention is further achieved by a method for manufacturing a one-piece-woven airbag (OPW airbag), specifically a one-piece-woven head side airbag or a one-piece-woven head-thorax side airbag.

The method according to the invention comprises at least the following steps of:
weaving an OPW airbag by a multi-layer weaving process, the airbag including at least two opposite fabric layers which form an inner wall and an outer wall and are connected to each other at least in a peripheral region, wherein the opposite fabric layers are not interwoven in a segment of the peripheral region so that a mounting hole is formed, positioning a sealing element on a gas generator mount disposed in either of the fabric layers, establishing an adhesive connection between the sealing element and the fabric layer, in particular by ultrasonic welding or adhesive bonding, closing the mounting hole, in particular by ultrasonic welding.

The adhesive connection can be established by an ultrasonic welding process in which the sealing element is positioned on the gas generator mount via a mounting aid that preferably at the same time forms the converter of the ultrasonic welding device. For ultrasonic welding the sealing element to the fabric layer and, thus, establishing the adhesive connection, an ultrasonic vibration is transmitted from the converter to a sonotrode of the ultrasonic welding device, thus causing the sealing element, in particular the weld element of the sealing element, and the fabric layer to be heated and connected to each other in this area.

Alternatively, the adhesive connection can be made by an adhesive bonding process, specifically a heat-sealing process. The sealing element is positioned on the gas generator mount via a mounting aid that is preferably configured as a positioning tool of the heat-sealing device. For adhesively bonding the sealing element to the fabric layer and, thus, establishing the adhesive connection, the sealing element, particularly the adhesive element of the sealing element, is heated by a heating die of the heating device so that the sealing element, particularly the adhesive element of the sealing element, is adhesively connected to the fabric layer.

The opening for the gas generator mount can be introduced to one of the fabric layers of the OPW airbag already in the multi-layer weaving process during manufacture of the OPW airbag. Alternatively, the opening for the gas generator mount can be introduced to the fabric layer after weaving the OPW airbag.

The opening for the gas generator mount is preferably arranged in or introduced to the fabric layer that forms the outer wall of the OPW airbag.

Preferably, in the method for manufacturing the OPW airbag at least one gas generator securing element is attached to the OPW airbag. The gas generator securing element can be in the form of a fabric strap, for example, that is formed integrally with at least one of the fabric layers in the multi-layer weaving process. As an alternative, the gas generator securing element can also be in the form of a fabric strap that is a separate component and is secured to at least one of the fabric layers of the OPW airbag by a suitable connection, particularly by ultrasonic welding, welding, sewing and/or adhesive bonding.

Furthermore, the object of the invention is achieved by a method for manufacturing an airbag module comprising at least the following steps of: providing a one-piece-woven airbag, in particular an afore-described one-piece-woven airbag according to the invention or a one-piece-woven airbag that was manufactured in accordance with the afore-described method according to the invention, connecting a gas generator to the one-piece-woven airbag by introducing a discharge portion of a diffusor, specifically a T diffusor, of the gas generator into the gas generator mount, securing the gas generator to the airbag and/or to a module holder of the airbag module by at least one gas generator securing element.

The discharge portion of the diffusor of the gas generator is preferably introduced into the gas generator mount of the airbag in such a way that discharge openings of the discharge portion are disposed in the interior of the airbag.

In the method for manufacturing the airbag module, folding of the airbag can be done before connecting the gas generator to the one-piece-woven airbag or after connecting the gas generator to the one-piece-woven airbag. In addition, a mounting tube that maintains the airbag in the folded state can be provided to be disposed around the folded airbag.

BRIEF DESCRIPTION OF THE DRAWINGS

Further advantages, features and details of the invention will be apparent from the following description of a non-limiting embodiment as well as by means of the drawings, wherein FIG. 1 a) shows a schematic representation of an embodiment of an airbag according to the invention and b) shows a detail view of the airbag in the area of a gas generator mount.

DESCRIPTION

Figure 2:
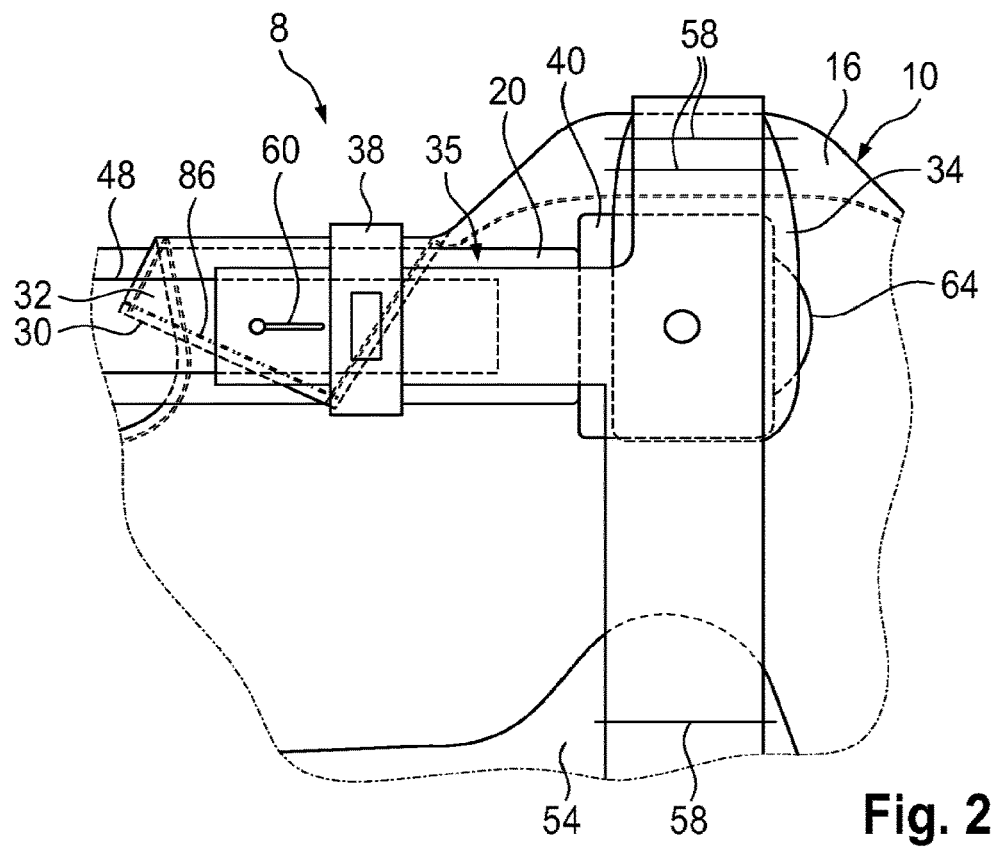
FIG. 2 shows a schematic front view of the area of a gas generator mount of an embodiment of an airbag module according to the invention.

FIGS. 1a and 1b illustrate an airbag 10 according to the invention that is configured as a head side airbag 10 in the shown embodiment.

The airbag 10 comprises at least two opposite fabric layers 12 and 14 forming at least one inner wall 13 and one outer wall 15 of the airbag 10. The airbag 10 is formed integrally by a multi-layer weaving process in which the fabric layers 12 and 14 are interwoven at least in a peripheral region 16. The dashed double line in FIG. 1b constitutes the delimitation of the peripheral region 16 from which the fabric layers 12 and 14 are not interwoven so as to form an airbag interior 50.

The airbag 10 shown in FIG. 1a further comprises partition portions 54 in which the two fabric layers 12 and 14 are equally interwoven so that the airbag 10 cannot be inflated in this area.

The shown airbag 10 moreover comprises plural airbag securing portions 82 provided for securing the airbag 10 and, resp., an airbag module 8 including the airbag 10 in a vehicle.

FIG. 1b illustrates that the airbag 10 shown here has a gas generator mount 18 in the outer wall 15 formed by the fabric layer 14. The gas generator mount 18 comprises a sealing element 22 which in this case is adhesively connected, for example by ultrasonic welding or adhesive bonding, to the fabric layer 14 comprising the generator mount 18.

For connecting the sealing element 22 to the fabric layer 14, the airbag 10 comprises, in the peripheral region 16 adjacent to the gas generator mount 18, a mounting hole 30 in which the two opposite fabric layers 12 and 14 are not interwoven. The fabric layers 12 and 14 can be connected to each other in the area of the mounting hole 30 by ultrasonic welding or sewing, for example, and the mounting hole 30 can thus be closed. In the airbag 10 shown here, the mounting hole 30 is disposed in a tubular extension 32 formed by the opposite fabric layers 12 and 14. The mounting hole 30 can be used in the airbag 10 especially for introducing a mounting aid 66 (see FIGS. 9 to 13) for securing the sealing element 22 to the gas generator mount 18, when the airbag 10 is manufactured. To this end, the mounting hole may have a width b from 40 mm to 100 mm, in particular from 60 mm to 80 mm.

The airbag 10 further comprises gas generator securing elements 34 and 36. The gas generator securing element 36 is formed integrally with the airbag 10 in the shown embodiment. A gas generator securing element 36 of this type formed integrally with the airbag 10 is already manufactured in one piece along with the fabric layers 12 and 14 when the airbag 10 is manufactured in the multi-layer weaving process. The gas generator securing element 36 shown here is configured as a loop adjacent to the peripheral region 16 for receiving a tubular gas generator 20.

The further gas generator securing element 34 shown here is secured to the airbag 10 via fixing seams 58. FIG. 1a illustrates the gas generator securing element 36 in a state for securing an external gas generator 20 in which the gas generator securing element 36 is secured to the airbag 10 via fixing seams 58 both in a peripheral region 16 and in a partition portion 54 (see also FIGS. 2 and 3 in which also the gas generator 20 is illustrated).

In FIG. 1b, the gas generator securing element 36 (shown in dashed line) is shown in a state before securing the external gas generator 20 and is connected to the airbag 10 only in the peripheral region 16 via fixing seams 58.

As an alternative to the securing via the fixing seams 58, the airbag 10 may be provided to include, in the peripheral region 16, airbag fixing element mounts 56 which are introduced to the peripheral region as slot openings, for example. In such embodiment, the gas generator securing element 36 is threaded through the slot-type airbag fixing element mounts 56, for example, for securing in the peripheral region 16 of the airbag 10. The one end of the gas generator securing element 36 may be connected, e.g., to the gas generator 20 and the other end may be connected to the airbag 10, in particular in the area of a partition portion 54, via a fixing seam 58, for example.

Figure 3:
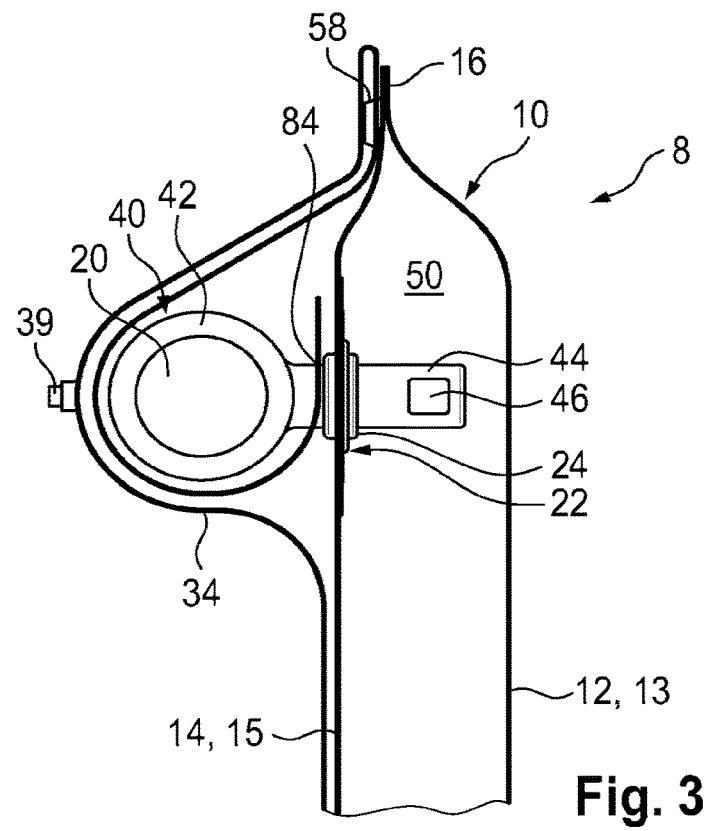
FIG. 3 shows a schematic lateral view of the area of the gas generator mount of the airbag module according to FIG. 2.

The FIGS. 2 and 3 show the securing of the gas generator 20 to the airbag 10 in the area of the gas generator mount 18 in an enlarged representation.

The gas generator 20 is disposed outboards on the airbag 10 of the airbag module 20 so that the discharge portion 44 of the diffusor 40 is accommodated in the gas generator mount 18 of the airbag 10. The discharge openings 46 of the discharge portion 44 are disposed in the airbag interior 50 so that, when the airbag module 8 is activated, the outflowing gas can fill the airbag 8.

For securing the gas generator 20 outboards on the airbag 10 according to the invention as set forth in the embodiment of FIGS. 2 and 3, initially the discharge portion 44 of the T diffusor 40 of the gas generator 20 is put through a diffusor mount 84 on the gas generator securing element 34, before the discharge portion 84 is inserted into the dedicated gas generator mount 18 so that the gas generator securing element 34 encompasses the gas generator 20 at the axial end 64 in the area of the diffusor 40, see FIG. 3. Accordingly, the gas generator securing element 34 can be secured to the airbag via the fixing seams 58 in the area of the edge 16 already before inserting the gas generator 20 or after inserting the gas generator 20.

In order to safely fix the discharge portion 44 of the gas generator 20 in the gas generator mount 18, the gas generator securing element 34 is tightened once more over the axial end 64 of the gas generator 20 and, in the shown embodiment, is secured to the airbag 10 via a fixing seam 58 in the area of a partition portion 54. Securing of the gas generator securing element 34 can also be performed via the fixing seam 58 in the area of the partition portion already before inserting the gas generator 20 or only after inserting the gas generator 20.

In the illustrated embodiment, the gas generator securing element 34 is connected to a module holder 48 of the airbag module 8 via a module holder mount 60 in the area of a gas generator securing element portion 35.

For minimizing the load upon the closing seam 86 of the mounting hole 30 which is particularly configured as a weld seam produced by ultrasonic welding, the tubular extension 32 is wrapped, when the gas generator 20 is secured to the airbag 10, around the gas generator 20 such that it is disposed between the gas generator 20 and the module holder 48.

FIG. 2 illustrates that, in this case, moreover a gas generator securing element 38 configured as clip or clamp which additionally fixes the gas generator securing element portion 35 and the module holder 48 to the airbag 10 and fixes the tubular extension 32 between the gas generator 20 and the module holder 48 is used to secure the gas generator 20 to the airbag 10.

Figure 4:
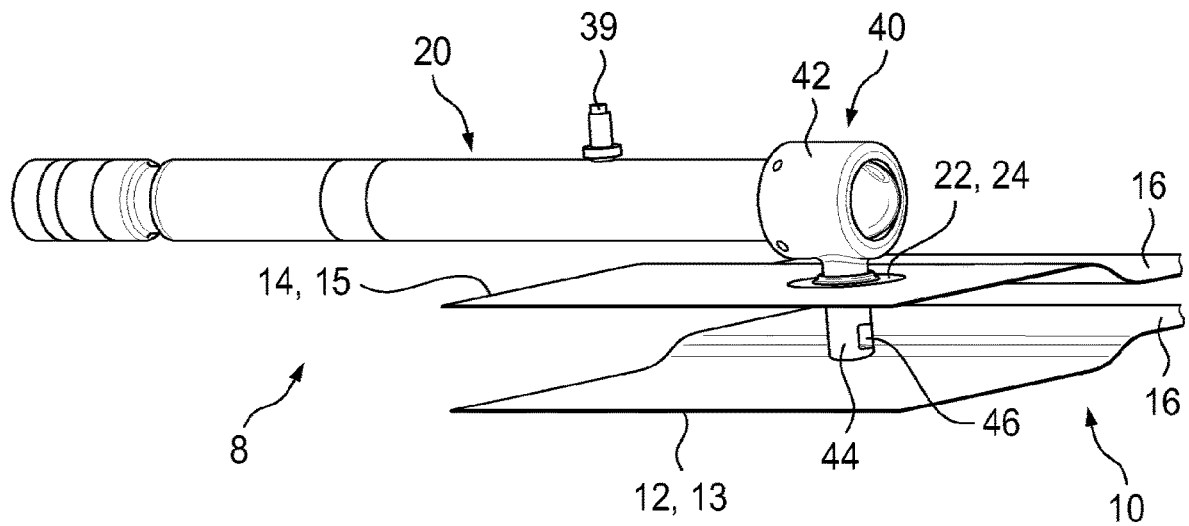
FIG. 4 shows a perspective view of a cutout of an airbag according to the invention in the area of a gas generator mount as well as a gas generator associated with the gas generator mount.
Figure 5:
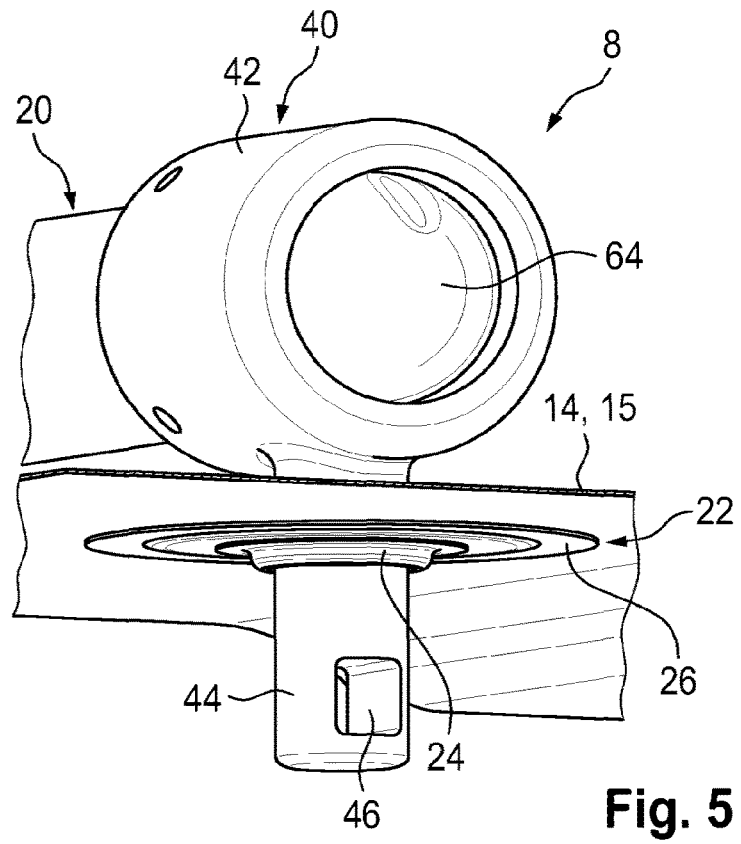
FIG. 5 shows an enlarged perspective representation of the gas generator mount of the airbag according to the invention and of the associated gas generator according to FIG. 4.
Figure 6:
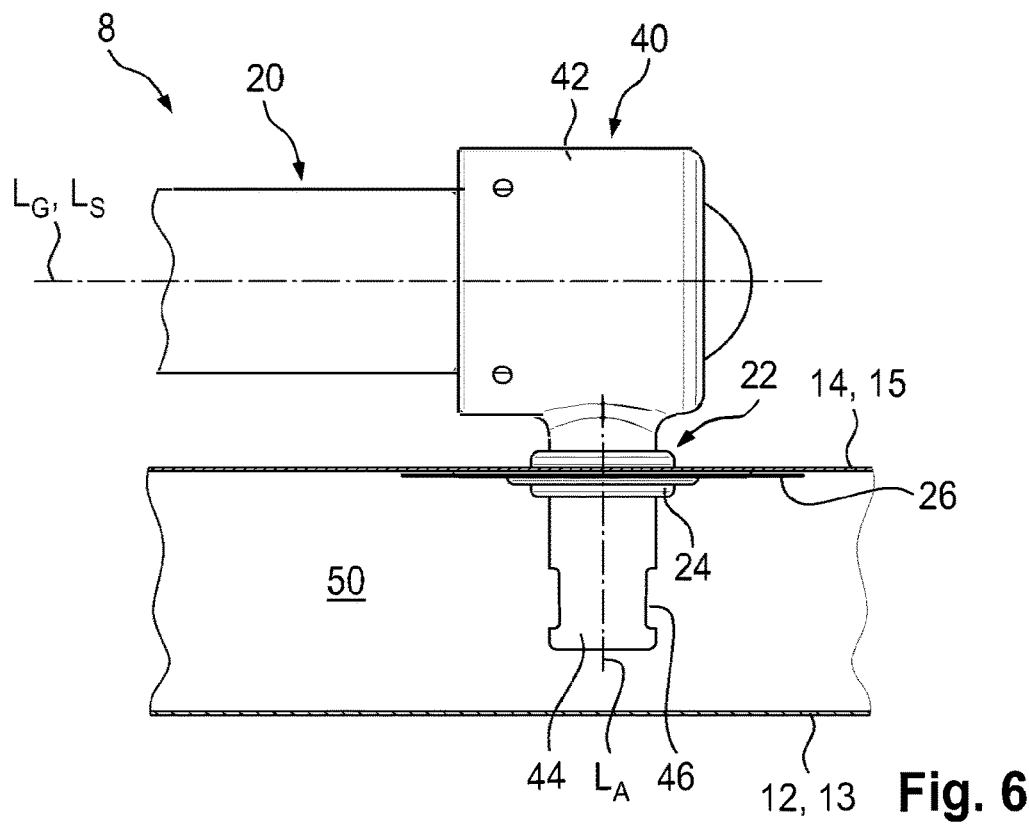
FIG. 6 shows a schematic top view of the gas generator mount of the airbag according to the invention and of the associated gas generator according to FIG. 4.
Figure 7:
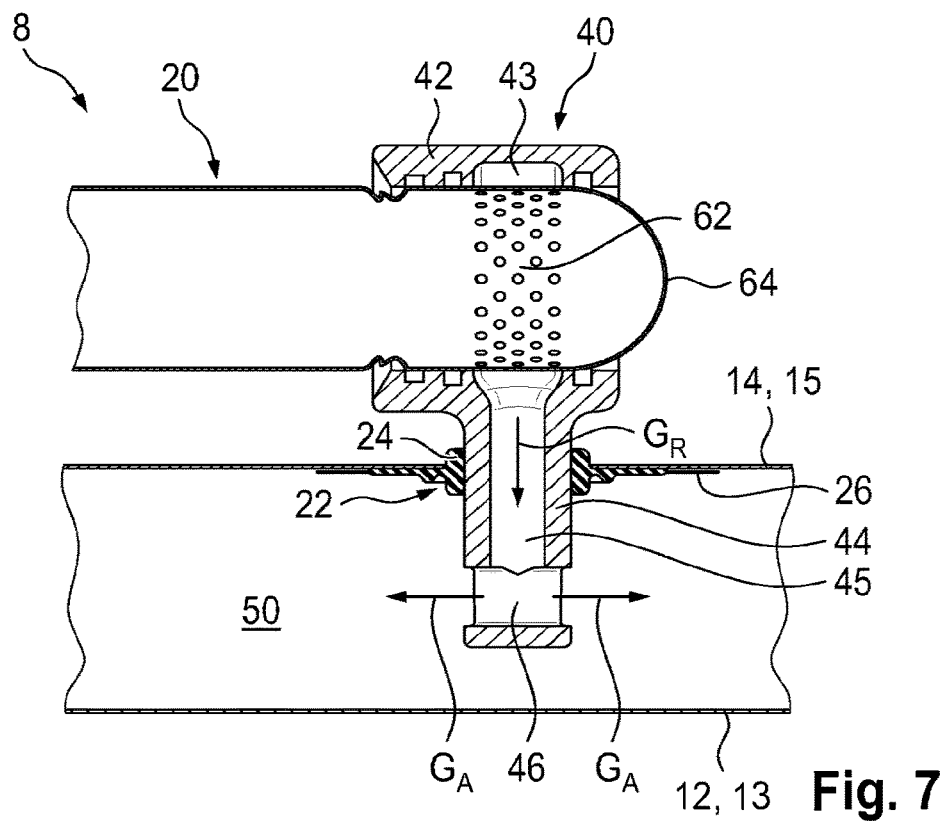
FIG. 7 shows a schematic sectional view across the gas generator mount of the airbag according to the invention and the associated gas generator according to FIG. 6.

FIGS. 4 to 7 illustrate the area of the gas generator mount 18 of the airbag 10 of an airbag module 8 according to the invention in an enlarged representation. FIG. 4 illustrates the airbag 10 in an exploded view for better illustration.

FIG. 4 shows that the gas generator 20 comprises a gas generator securing element 39 configured as a bolt welded to the gas generator. The gas generator can be secured to a module holder 48 (see FIG. 2) of the airbag module 8 via the gas generator securing element 39.

The sealing element 22 illustrated in FIGS. 4 to 7 is adhesively connected to the fabric layer 14 constituting the outer wall 15 by ultrasonic welding. The sealing element includes a seal membrane 24 for sealing the connection between the airbag 10 and the discharge portion 44 of the gas generator 20 in the area of the gas generator mount 18. In order to achieve proper sealing, the seal membrane is preferably made of silicone. The sealing element is connected to the fabric layer 14 via a welded portion 26. In order to obtain a stable welded connection, the weld element 26 is preferably made of the same material as the fabric layers 12 and 14 of the airbag 10. The weld portion can consist particularly of a film that is made of the same material as the fabric layers 12 and 14, or can be an airbag fabric.

In order to pass, upon activation of the gas generator 20, the gas from the external gas generator 20 into the airbag interior 50, the gas generator 20 includes a diffusor 40 in the form of a T diffusor 40.

The diffusor 40 (see also FIG. 8) comprises a collecting portion 42 and a discharge portion 44 that protrudes or projects radially from the collecting portion 42. The diffusor 40 encloses the gas generator 20 at the axial end 64 in which the outflow area 62 including outflow openings is disposed. Accordingly, a longitudinal axis LG of the gas generator 20 coincides with a longitudinal axis LS of the collecting portion 42 of the diffusor 40 (see FIG. 6).

In the state disposed on the gas generator 20, the collecting portion 42 encloses with a collecting chamber 43 the outflow openings of the outflow area 62 of the gas generator 20. The gas radially exiting the gas generator 20 is passed into the discharge passage 45 of the discharge portion 44 via the collecting chamber 43. In the discharge portion 44, the radial gas flow direction GR is deflected to an axial gas flow direction GA before it flows out of the discharge openings 46 from the discharge portion 44 into the airbag interior 50.

Figure 8:
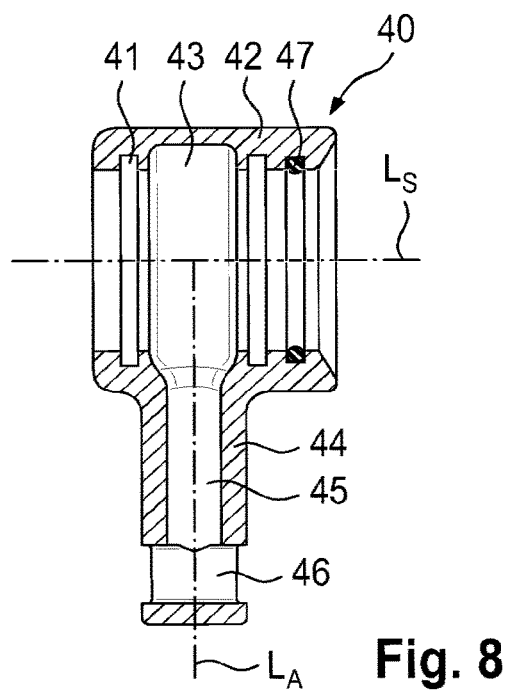
FIG. 8 shows a schematic sectional view across a T diffusor of the gas generator of FIG. 4.

It is further apparent from FIG. 8 that the diffusor 40 may include one or more sealing element mounts 41 for accommodating one or more sealing elements 47. FIG. 8 moreover shows that the diffusor 40 is referred to as T diffusor 40, as the longitudinal axis LA of the discharge portion 44 and the longitudinal axis LS of the collecting portion 42 are aligned with each other in T-shape. As a matter of course, it may also be provided that the longitudinal axis LA of the discharge portion 44 is arranged vis-à-vis the longitudinal axis LS of the collecting portion 42, and thus also the discharge portion 44 vis-à-vis the collecting portion 42, at an angle not equal to 90°. As an alternative to the shown configuration as a separate component, the diffusor and the gas generator housing may be formed in one piece (not shown).

FIGS. 9 to 13 schematically illustrate devices for establishing the adhesive connection between either of the fabric layers 12 or 14 and the sealing element 22. A detailed representation of the area of the airbag 10 adjacent to the gas generator mount 18 which may include, inter alia, the mounting hole 30 and/or the tubular extension 32, is dispensed with for reasons of clarity.

Figure 9:
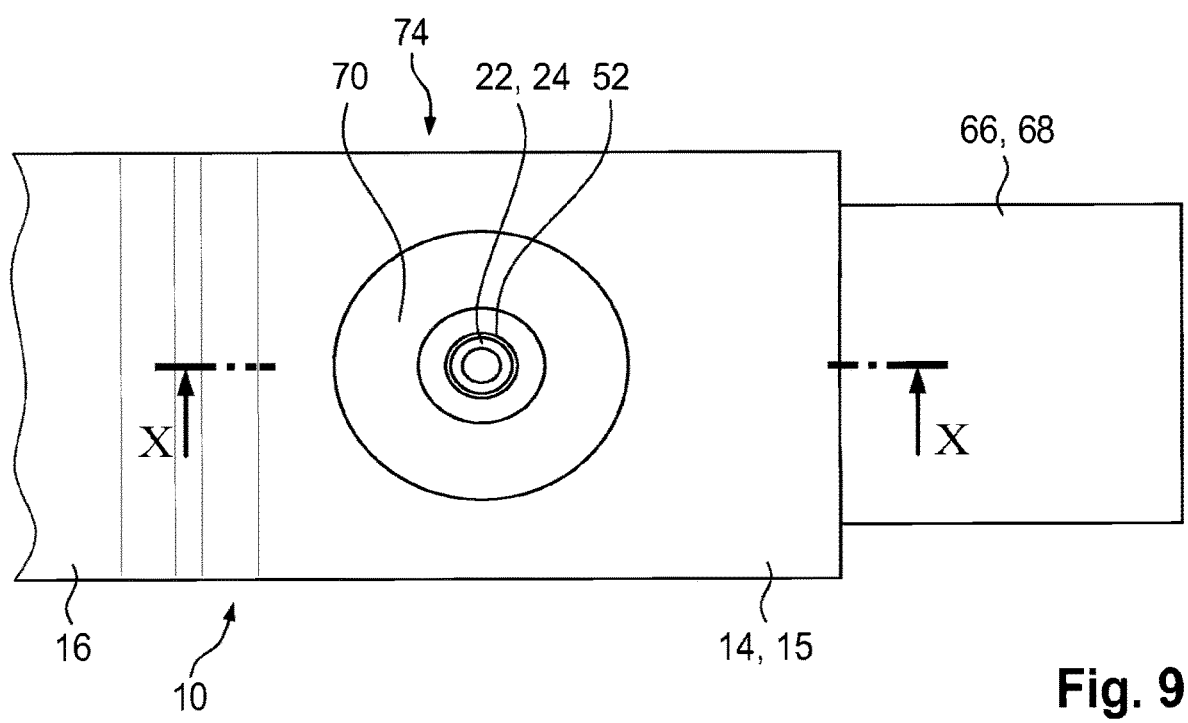
FIG. 9 shows a schematic representation of a gas generator mount when positioning and connecting a sealing element on and, resp., to the gas generator mount of an airbag according to the invention by a mounting aid.
Figure 10:
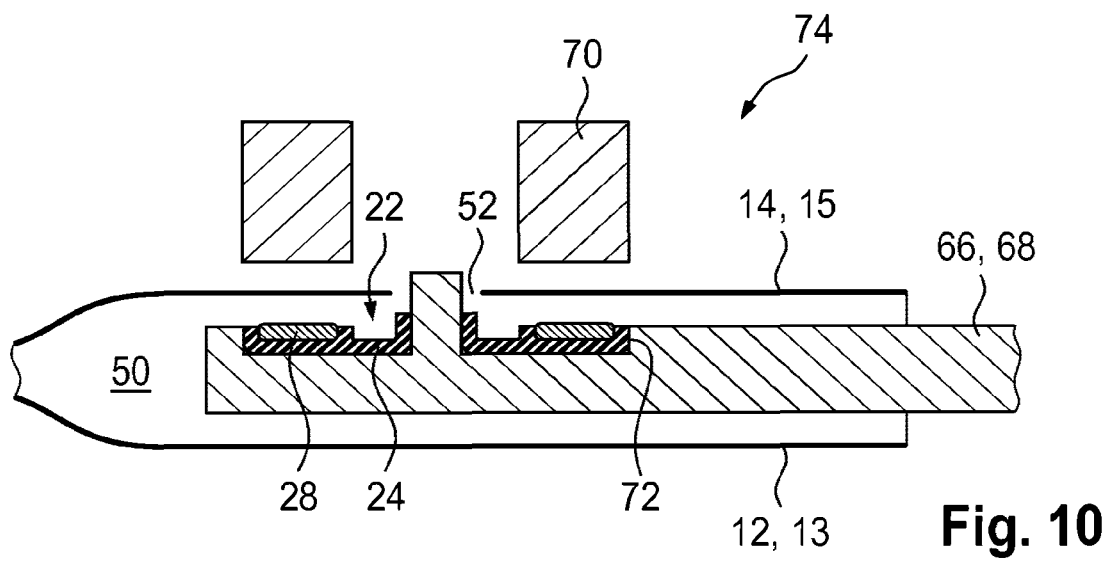
FIG. 10 shows a sectional view across the gas generator mount along the line X-X according to FIG. 9.
Figure 11:
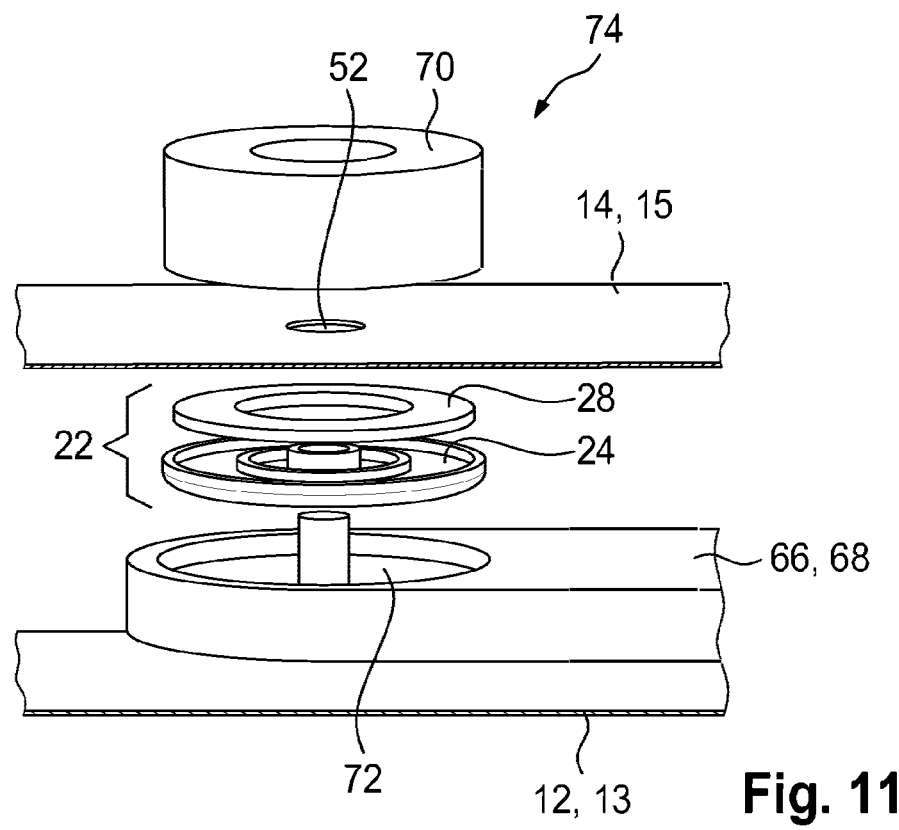
FIG. 11 shows a schematic exploded view of the gas generator mount, the sealing element and the mounting aid according to FIG. 9.

The sealing element 22 shown in FIGS. 9 to 11 comprises a seal membrane 24 and a bonding element 28. The sealing element 22 can be adhesively connected to either of the fabric layers 12 or 14, in this case the fabric layer 14, via the bonding element 28 by adhesive bonding.

For establishing such an adhesive bonded joint, a heat-sealing technique can be utilized, for example.

For this purpose, the sealing element 22 is placed in a sealing element positioning mount 72 of a mounting aid 66 which is a positioning tool 68 of a heat-sealing device 74 in this case. After that, the positioning tool 68 is inserted into the airbag interior 50 through the mounting hole 30, and the sealing element 22 is positioned relative to an opening 52 of the gas generator mount 18 so that an axis of rotation of the sealing element 22 is disposed in the center of the opening 52. Then the sealing element 22 is pressed by the positioning tool 68 at said position from inside against the fabric layer 14 so as to connect the sealing element 22 to the fabric layer 14. For establishing the bonded joint, on the outer face, a heating die 70 is pressed against the fabric layer 14 and the positioning tool 68 with the sealing element 22 located in the airbag interior 50. Subsequently, the bonding element 28 can be heated via the heating die 70 so that the bonding element 28 of the sealing element can be adhesively connected to the fabric layer 14.

Figure 12:
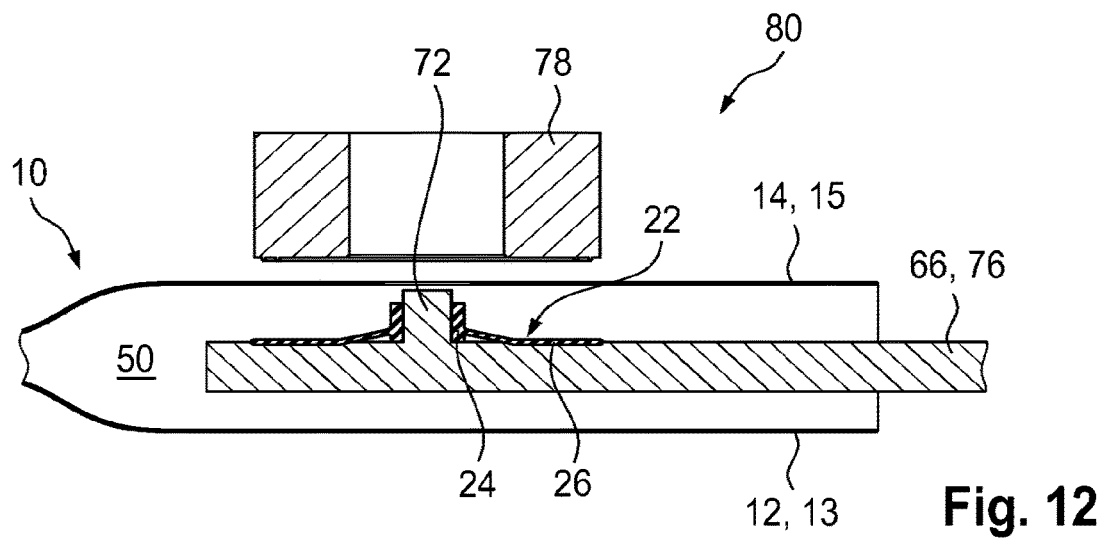
FIG. 12 shows a schematic representation of a gas generator mount when positioning and connecting a sealing element on and, resp., to the gas generator mount of an airbag according to the invention by an alternative mounting aid.
Figure 13:
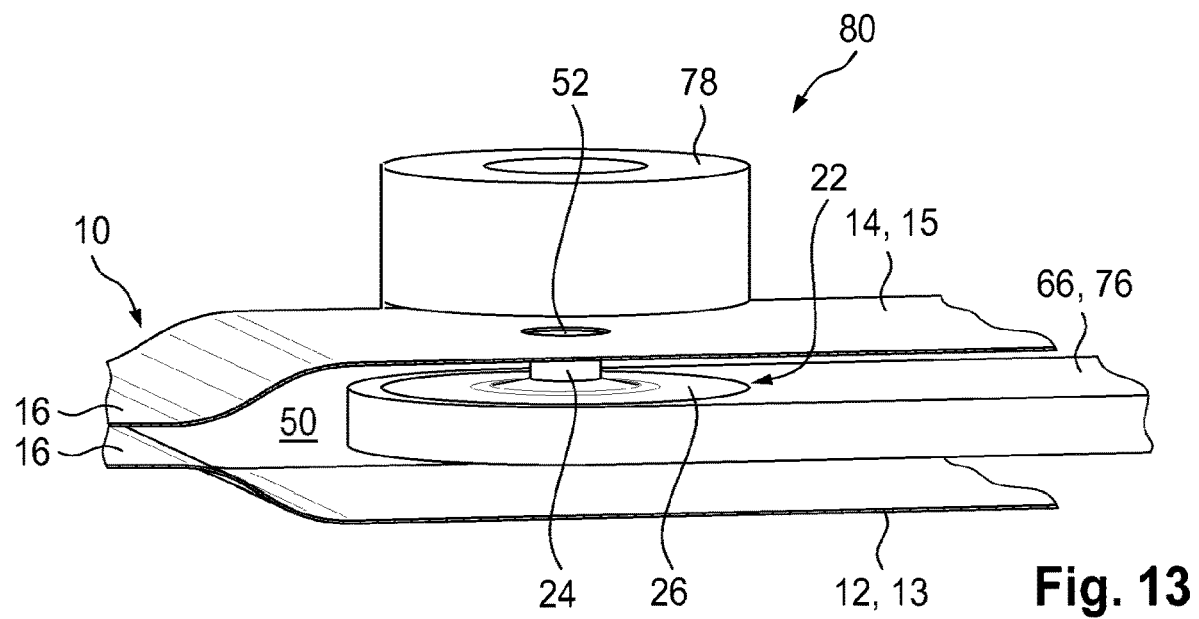
FIG. 13 shows a perspective schematic representation of the gas generator mount according to FIG. 12.

The sealing element 22 shown in FIGS. 12 and 13 includes a seal membrane 24 and a weld element 26. The sealing element 22 can be adhesively connected, via the weld element 26, to either of the fabric layers 12 or 14, in this case the fabric layer 14, by welding, specifically ultrasonic welding.

For establishing such an adhesive welded joint, an ultrasonic welding technique can be utilized, for example.

For this purpose, the sealing element 22 is placed on a sealing element positioning mount 72 of a mounting aid 66 which is in the form of a converter 76 of an ultrasonic welding device 80 in this case. Subsequently, the converter 76 is inserted into the airbag interior 50 via the mounting hole 30, and the sealing element 22 is positioned relative to an opening 52 of the gas generator mount 18 so that an axis of rotation of the sealing element 22 is disposed in the center of the opening 52. After that, the sealing element 22 is pressed, in this position, from inside against the fabric layer 14 by the converter 76 so as to connect the sealing element 22 to the fabric layer 14. For establishing the ultrasonic welded connection, on the outside a sonotrode 78 of the ultrasonic welding device 80 is pressed against the fabric layer 14 and the converter 76 with the sealing element 22 located in the airbag interior 50. Subsequently, an ultrasonic vibration can be generated via the converter 76 and can be transmitted to the sonotrode 78, thus causing the welded element 26 and the fabric layer 14 to be heated in this area and to be adhesively connected to each other by fusion, for example.

The invention claimed is:

1. A side airbag comprising at least two opposite fabric layers which form at least one inner wall and one outer wall of the side airbag, wherein the side airbag is manufactured in one piece by a multi-layer weaving process in which the fabric layers are interwoven at least in a peripheral region, wherein a gas generator mount for an external gas generator is disposed in one of the two fabric layers.

2. The side airbag according to claim 1, wherein the gas generator mount comprises a sealing element.

3. The side airbag according to claim 2, wherein the sealing element is adhesively connected to the fabric layer comprising the gas generator mount.

4. The side airbag according to claim 2, wherein the sealing element is adhesively connected by ultrasonic welding to the fabric layer comprising the gas generator mount.

5. The side airbag according to claim 1, wherein the sealing element includes a seal membrane and a weld element or a seal membrane and a bonding element, the sealing element being specifically a two-component part and the seal membrane and the weld element or the seal membrane and the bonding element consisting of different materials.

6. The side airbag according to claim 5, wherein the seal membrane is made of a silicone.

7. The side airbag according to claim 5, wherein the weld element is made of an airbag fabric or of the same material as the airbag fabric.

8. The side airbag according to claim 1, wherein the side airbag comprises, in the peripheral region adjacent to the gas generator mount, a mounting hole in which the two opposite fabric layers are not interwoven, wherein the fabric layers are connected to each other and closed by ultrasonic welding or sewing in the area of the mounting hole.

9. The side airbag according to claim 8, wherein a width of the mounting hole ranges from 40 mm to 100 mm.

10. The side airbag according to claim 8, wherein the mounting hole is disposed in a tubular extension formed by the opposite fabric layers.

11. The side airbag according to claim 8, wherein a width of the mounting hole ranges from 60 mm to 80 mm.

12. The side airbag according to claim 1, comprising at least one gas generator securing element formed integrally with the side airbag or secured to at least one of the fabric layers of the side airbag.

13. The side airbag according to claim 1, wherein the fabric layer forming at least one of the inner wall and the outer wall is coated at least in portions.

14. An airbag module comprising a side airbag according to claim 1 and a gas generator with a diffusor, the diffusor being in the form of a T-diffusor having a collecting portion and a discharge portion, wherein the gas generator is disposed outboard of the side airbag, wherein the discharge portion of the diffusor is accommodated in the gas generator mount of the side airbag so that discharge openings of the diffusor are disposed in an airbag interior and the gas generator is secured to the side airbag and/or to a module holder via gas generator securing elements.

15. A method for manufacturing an airbag module, comprising at least the following steps of:
  providing a one-piece-woven side airbag according to claim 1,
  connecting a gas generator to the one-piece-woven side airbag by introducing a discharge portion of a diffusor of the gas generator into the gas generator mount,
  securing the airbag generator to the side airbag and/or to a module holder of the airbag module by at least one gas generator securing element.

16. The side airbag according to claim 1, wherein the side airbag comprises a one-piece-woven head side airbag or a one-piece-woven head-thorax side airbag.

17. The side airbag according to claim 1, wherein the fabric layer forming at least one of the inner wall and the outer wall is coated at least in portions by an externally applied film.

* * * * *